US008252865B2

(12) United States Patent
Gonzalez Leon et al.

(10) Patent No.: US 8,252,865 B2
(45) Date of Patent: Aug. 28, 2012

(54) SUPRAMOLECULAR POLYMER-CONTAINING BITUMINOUS COMPOSITION

(75) Inventors: Juan Antonio Gonzalez Leon, Lyons (FR); Jean-Philippe Gillet, Brignais (FR); Gilles Barreto, Messimy (FR); Manuel Hidalgo, Brignais (FR); Vincent Luca, Solaize (FR)

(73) Assignee: CECA S.A., La Garenne Colombes (FR)

( * ) Notice: Subject to any disclaimer, the term of this patent is extended or adjusted under 35 U.S.C. 154(b) by 0 days.

(21) Appl. No.: 13/288,339

(22) Filed: Nov. 3, 2011

(65) Prior Publication Data

US 2012/0046395 A1 Feb. 23, 2012

Related U.S. Application Data

(62) Division of application No. 12/849,321, filed on Aug. 3, 2010, now Pat. No. 8,076,398.

(60) Provisional application No. 61/231,101, filed on Aug. 4, 2009.

(30) Foreign Application Priority Data

Aug. 4, 2009 (FR) ...................................... 09 55472

(51) Int. Cl.
  *C08L 77/00* (2006.01)
(52) U.S. Cl. ...................................................... 524/607
(58) Field of Classification Search .................... 524/607
  See application file for complete search history.

(56) References Cited

U.S. PATENT DOCUMENTS

| 5,618,862 | A | 4/1997 | Germanaud et al. |
| 5,743,950 | A | 4/1998 | Hendriks et al. |
| 5,910,212 | A | 6/1999 | Hendriks et al. |
| 6,156,113 | A | 12/2000 | Pasquier |
| 6,588,974 | B2 | 7/2003 | Hildebrand et al. |
| 7,250,487 | B2 | 7/2007 | Tournilhae et al. |
| 7,595,356 | B2 | 9/2009 | Lommerts et al. |
| 7,670,420 | B2 | 3/2010 | Ballie et al. |
| 7,732,511 | B2 | 6/2010 | Barreto et al. |
| 2005/0076810 | A1 | 4/2005 | Barthel et al. |
| 2006/0236614 | A1 | 10/2006 | Antoine et al. |
| 2008/0015288 | A1 | 1/2008 | Antoine et al. |
| 2008/0194738 | A1 | 8/2008 | Crews et al. |
| 2008/0259714 | A1 | 10/2008 | Brock et al. |
| 2009/0062551 | A1 | 3/2009 | Tournilhae et al. |
| 2009/0203815 | A1 | 8/2009 | Barreto et al. |
| 2010/0135940 | A1 | 6/2010 | Grimaldi et al. |
| 2011/0009533 | A1 | 1/2011 | Gonzalez Leon et al. |

FOREIGN PATENT DOCUMENTS

| EP | 1 469 038 A1 | 10/2004 |
| GB | 1156793 | 7/1969 |
| WO | WO 01/07396 A1 | 2/2001 |
| WO | WO 2008/029065 A2 | 3/2008 |
| WO | WO 2008/148974 A2 | 12/2008 |
| WO | WO 2009/101275 A1 | 8/2009 |

*Primary Examiner* — Peter Szekely
(74) *Attorney, Agent, or Firm* — RatnerPrestia

(57) ABSTRACT

The present invention relates to a bituminous composition comprising at least one bitumen and at least one polycondensate capable of forming a supramolecular assembly comprising one or more associative group(s). The present invention also relates to the use of such bituminous composition for the preparation of asphalt mixtures useful for the coating of rolling surfaces, for the preparation of water-proofing coatings, and the for the preparation of adhesive formulations.

7 Claims, No Drawings

SUPRAMOLECULAR POLYMER-CONTAINING BITUMINOUS COMPOSITION

This application is a divisional application of U.S. application Ser. No. 12/849,321 filed Aug. 3, 2010 which claims priority to U.S. Provisional application No. 61/231,101 filed Aug. 4, 2009 and FR09.55472 filed Aug. 4, 2009.

FIELD OF INVENTION

This invention relates to bituminous compositions comprising specific polymer materials used particularly for the preparation of asphalt mixtures with enhanced mechanical properties. In particular, the present invention relates to compositions of bitumen with polymers capable of forming a supramolecular assembly that confers enhanced mechanical properties to the mixture and their applications. Examples of such applications are in roofing, in the fabrication of asphalts mixtures with mineral aggregates for the construction, or maintenance of sidewalks, roads, highways, parking lots or airport runaways and service roads and any other rolling surfaces.

Bitumen or asphalt is the heaviest portion from the oil distillation process. Due to the different origins and distillation processes of such oils, the resulting bitumen may have a wide range of properties and characteristics. In the present invention, bitumen refers not only to the product from oil by direct distillation or from distillation of oil at reduced pressures, but as well the product coming from the extraction of tar and bituminous sands, the product of oxidation and/or fluxation with carbonated solvents including paraffins and waxes of such bituminous materials, as well as blown or semi-blown bitumens, synthetic bitumens (such as described in FR 2 853 647 A1), tars, oil resins or indene-coumarone resins mixed with aromatic and/or paraffinic hydrocarbons, the mixtures of such and the mixtures of such bituminous materials with acids and the like.

The main application for bitumen is in asphalt mixtures where the bitumen is mixed with mineral aggregates that can be of different size, shape and chemical nature. These asphalt mixtures are particularly used for construction or maintenance of sidewalks, roads, highways, parking lots or airport runaways and service roads and any other rolling surfaces. In the present invention, mineral aggregates are the product from quarries as well as aggregates recuperated from previous asphalt mixtures (as described in the AFNOR XP P98-135, December 2001 and in the Asphalt Handbook MS-4 $7^{th}$ edition, published by the Asphalt Institute), products from building demolition and their mixtures. Other common components in asphalt mixtures are organic and inorganic fibres, such as glass, metal or carbon fibres, as well as, cellulose, cotton, polypropylene, polyester, vinyl and polyamide fibres.

It is known by any person skilled in the art, that polymers can be added to the bitumen in order to produce asphalt mixtures with enhanced mechanical properties. Polymers are large molecules formed by the chemical linkage of several repeating units or monomers. Modification of bitumen with polymers of high molecular weights (above ~10,000 g/mol) is generally required to improve the mechanical behaviour of an asphalt mixture.

Although there exist solutions to harden bitumen, for example by incorporating paraffins or polyphosphoric acid, aiming at increasing the stiffness of the bitumen at high service temperature to avoid rutting. These solutions are only partial because the high thermal susceptibility of the modified bitumen remains (unlike as in polymer modified bitumens, where it is improved at high and low temperatures) creating or even enhancing problems at low temperature like for example a lack of flexibility.

Hence polymer modification of bitumen is very often used to increase its low temperature flexibility, that is below the ambient temperature and down to about −40° C., and the same polymer modification increases the softening point of the bitumen. It can also increase the cohesion and stiffness of the bitumen at high service temperature and consequently that of the asphalt mixture made with it, improving its resistance to rutting. Examples of polymers commonly used in the modification of bitumen are: styrene butadiene rubbers, styrene/butadiene block copolymers, ethylene vinyl acetate copolymers, ethylene acrylate copolymers, polyethylene and other alpha-polyolefins (see "Asphalt binder testing manual", Asphalt Institute 2007). The use of non-crosslinked low molecular weight polymers, also known as oligomers, or other small molecules cannot modify the bitumen in the manner as polymers do.

GB 1156793 describes the use of polyamides to modify the bitumen for surface coatings compositions. They claimed that the addition of the polyamide resin confers to the bitumen the rheological property of thixotropy, which the bitumen does not have by itself.

Incorporating polymers into the bitumen, even at the low contents commonly used (from 2% to 6% of polymer) is not an easy task. Polymers and bitumen have at most only a partial compatibility that usually makes the polymer to phase separate from the bitumen overtime. In addition, due to the high viscosities of molten polymers, the mixing process requires high temperatures and long mixing times under vigorous agitation to achieve a good dispersion of the polymer in the bitumen. The required temperatures to achieve the dispersion of polymer into bitumen are generally higher than the usual storage and fabrication temperatures according to the pure, neat bitumen's nature.

For example, U.S. Pat. No. 5,618,862 shows as an example that the dispersion of a styrene butadiene copolymer with a molecular weight of 100,000 Daltons at 3.5% in bitumen with a penetration of 80/100 takes 2.5 hours at 175° C. to be homogeneous. For this kind of bitumen, a typical storage temperature of the neat bitumen is between 140° C. and 160° C. The higher temperatures required for dispersing the polymer in the bitumen may also prove to be detrimental to the bitumen properties since it would accelerate its oxidation. The addition of a crosslinking agent, such as a sulphur-containing compound, is also commonly used in polymer-modified bitumens to further increase its performance. Such network increases the viscosity of the bitumen even further and avoids phase separation. In addition, such sulphur-containing compounds combined with the high temperatures required to achieve the mixing present important safety issues during the modified bitumen fabrication process.

The difficulty to prepare modified bitumen with polymers makes the process accessible only to bitumen refiners or large construction companies which are the only ones capable of making such considerable investment in the adequate mixing equipment.

The use of a modified bitumen in order to fabricate an asphalt mixture generally results in a change of the fabrication process relatively to the unmodified bitumen. In the case of emulsions, for example, the addition of polymer may limit the grade of bitumen used since the emulsification process with water limits the temperature at which the bitumen can be added to avoid bitumen emulsion boiling which is detrimental to the emulsion stability. More viscous bitumen grades at higher temperatures may be used to fabricate emulsions in water at higher than atmospheric pressures to avoid water boiling. However, this adds a certain complexity to the emulsion fabrication process. In the case of hot mix asphalt fabrication, higher temperatures for fabrication, laying and compaction are required when modified bitumen is used. The higher viscosity of polymer-modified bitumen, compared to the one of the pure bitumen, can also bring problems to processing methods at temperatures below 100° C. and higher than room temperature, reducing the overall asphalt mixture fluidity.

It could of practical interest when the addition of a polymer material to bitumen could be achieved without any substantial increase in its fabrication temperature, compared to the pure bitumen, while still obtaining substantial enhancement in mechanical properties on the resulting asphalt mix.

Also, a temperature reduction during polymer dispersion and asphalt mixture fabrication process would be of practical interest because it would lead to several advantages. A reduction in the dispersion temperature, and/or in time, reduces the amount of bitumen oxidation and aging, extending the life of the final application, such as in an asphalt mix for a road. Should such reduction in temperature be translated to the asphalt mixture fabrication process, it would reduce the amount of energy consumed during dispersion and, most importantly, during an asphalt mixture fabrication process. Decreasing the aggregates and bitumen temperatures during the asphalt mixture fabrication process would also significantly reduce the amount of polluting emissions, including $CO_2$ and other greenhouse effect gases.

There are several approaches to reduce the time and temperature necessary for the dispersion of polymers in bitumen. One of such approaches is the addition of a solvent during the mixing, which can also be used to disperse the polymer before adding to the bitumen. The use of volatile solvents is not a practical option due to the polluting effect and difficulty of using them at elevated temperatures. Other solvents could be used such as vegetable oils or their derivates. The use of such solvents in the production of modified bitumens for asphalt mixtures often leads to a softening of the material and an increase in rutting.

WO 2005/087869 describes a composition of polymer-modified bitumen using a mono-alkyl ester of a vegetable oil as solvent to facilitate mixing. In addition, an amide additive is also added to partially overcome the decrement in mechanical properties due to the addition of the alkyl ester. However, the addition of about 6% of rapeseed oil methyl ester, to previously dissolve the polymer as stated in one of the examples, still make the mixture asphalt softer. In addition, a temperature higher than 160° C. and 30 minutes of stirring is still required to incorporate the polymer solution to the bitumen with a penetration of 160/220. A typical storage temperature for this kind of bitumen when pure is between 130° C. and 150° C.

U.S. Pat. No. 6,156,113 describes another approach to enhance the mechanical properties of the final bitumen composition while maintaining low viscosities at fabrication temperatures. In this patent, fatty acid monoesters are added to the bitumen to reduce viscosity by a solvation effect at fabrication conditions while, by the addition of a metal catalyst, crosslinking of such esters takes place under application conditions. This process may take several days. Although this method allows for low viscosities at fabrication conditions and enhanced mechanical properties of the final asphalt mixture, the use of certain metal catalysts may be restrained due to their negative impact to environment and men.

FR 2 871 804 proposes the use of a polymer-bitumen mixture containing a high level of polymer, called a master batch. This mixture is prepared with an extrusion device and then diluted with bitumen to get the right polymer dosage in a short time. The drawback of the solution is that a special device is still necessary to mix the polymer and the bitumen to produce the master batch, resulting in a considerable economic investment.

FR 2 924 121 describes the use of organogel molecules in bitumen compositions that improve the bitumen mechanical properties by forming thermoreversible networks with reduced viscosities at application temperatures. However, the process for the addition of the organogel molecules uses quite a high temperature (170° C. for an initial 50 penetration grade neat bitumen) and a relatively long mixing time of 2 hours.

Since the main problem with the addition of regular or conventional polymers into bitumen is their high viscosity, one solution would be to have a polymer with good mechanical properties at asphalt mixture application temperatures (about −20° C. to 70° C.) while having very low viscosity at elevated temperatures (above 100° C.). Such low viscosity at higher temperatures would make the dispersion of such polymer into the bitumen considerably easier under lower temperatures, milder mixing conditions and shorter mixing times. This would also result in an easier use of the modified bitumen thanks to the lower temperatures and or lower process duration.

Polymer materials with such properties can be achieved by the use of small or medium-sized molecules behaving as monomers (or oligomers) that assemble into a supramolecular polymer-like structure with non-covalent bonds at low temperatures, which dissociate at high temperatures.

WO 01/07396 describes a polymer-like material prepared from oligomers that can associate into large structures by means of hydrogen bonding between specific carboxylic acid and alcohol functional groups. The resulting material shows mechanical properties far superior to those of the original monomer, which increase with the number of associated functional oligomers. No application with bitumen is discussed in this text.

WO 03/059964 describes another supramolecular polymer based on a different chemistry. In this case, polymer-like properties are also achieved by the interconnection of the smaller molecules by hydrogen bonding. No application with bitumen is discussed in this text.

WO 2006/087475 describes an elastomer material formed by the supramolecular assembly of smaller molecules. The rubber-like material of this invention becomes a liquid above a certain temperature due to the dissociation of the hydrogen bonds. The transition from elastic polymer to liquid is reversible with temperature. No application with bitumen is discussed in this text.

According to a first aspect, it is the matter of this invention a bituminous composition, said bituminous composition being in the form of a dispersion or a solution, with mechanical properties similar to those achieved with conventional polymer-modified bitumens at final application conditions, comprising a bitumen and a polycondensate. The bituminous composition of the present invention comprises at least one polycondensate capable of forming a supramolecular assembly. This means that the above said polycondensate, as an isolated object, comprises at least one associative group that may form inter- and/or intra-molecular physical bonds building a physical network, resulting in a polymer with low viscosity at high temperatures (at which the network tends to dissociate) and high modulus at low temperatures (at which the network is mostly associated).

Surprisingly, the bituminous composition of the invention shows enhanced mechanical properties compared to that of the bitumen and therefore for its final application, among which the coating of rolling surfaces, water-proofing of surfaces, adhesives, such as asphalt mixtures for roads, parking lots or airport runaways, tack coats, cheap seal, surface dressing, surface impregnation, roof-coatings, or roofing membranes, wall and floor coatings, and waterproofing in general, as well as bituminous adhesive compositions.

The present invention has the advantage that the process of adding the polycondensate to the bitumen is done in a simple manner at similar temperatures at which the pure bitumen is stored. The incorporation of such polycondensate into the bitumen is considerably simpler than in conventional polymer-modified bitumen due to its low viscosity at high temperatures. Substantially lower temperature, shorter mixing times under mild to low shear conditions are required for its dispersion in bitumen, as compared to conventional polymer-modified bitumen. The present invention does not require any other chemical compound, such as catalyst or crosslinking agents to achieve the enhancement of the mechanical properties at application conditions, although some might be added, as well as other conventional additives, where appropriate.

Another advantage of the invention over other bituminous compositions comprising molecules with similar associative groups, capable of forming a thermoreversible network is the enhanced resistance to moisture sensibility of the asphalt mixture produced with it.

The bituminous composition of the present invention is in the form of a dispersion or a solution, and comprises at least one bitumen and at least one polycondensate comprising one or more associative groups capable of forming a supramolecular assembly.

By bitumen is meant a bituminous material obtained from the distillation of oil under atmospheric or reduced pressure, the product resulting from the extraction of tar and bituminous sands, the product of oxidation and/or fluxation with carbonated solvents including paraffins and waxes of such bituminous materials, as well as blown or semi-blown bitumens, synthetic bitumens (such as described in FR 2 853 647), tars, oil resins or indene-coumarone resins mixed with aromatic and/or paraffinic hydrocarbons, the mixtures of such and the mixtures of such bituminous materials with acids and the like.

In the present invention, the at least one polycondensate comprising one or more associative groups capable of forming a supramolecular assembly may be any kind of polymer obtained by a polycondensation reaction, and comprising at least one, preferably at least two, and more preferably at least three associative groups capable of forming a supramolecular assembly.

The polycondensation reaction may be a reaction between a carboxylic acid function and an amine function (and in this case the polycondensate is a polyamide), or between a carboxylic acid function and an alcohol function (and in this case the polycondensate is a polyester), or between an isocyanate function and an alcohol or an amine function (and in this case the polycondensate is a polyurethane or a polyurea).

More precisely, said polycondensate, mixed with at least one bitumen to form the bituminous composition of this invention, comprises:

α) at least two repeating units of formula (A1):

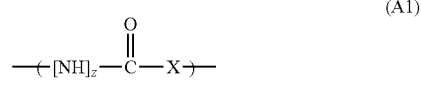

wherein X represents oxygen, $—C(R^1)(R^2)—$, or $—N(R^1)—$, wherein $R^1$ and $R^2$, which are the same or different, each independently represents hydrogen or a $C_1$-$C_6$ linear or branched alkyl, and z is an integer with values 0 or 1, provided that when z is 0, X does not represent $—C(R^1)(R^2)—$, the repeating units A1 being separated from each other by:

α1) different or identical linear or branched, saturated or unsaturated, $C_1$-$C_{100}$, preferably $C_6$-$C_{100}$ hydrocarbon chain(s), optionally containing hydrocarbon ring(s), aromatic and/or heterocyclic ring(s), and/or α2) alkylene oxide chain(s), such as a ethylene oxide, propylene oxide or butylene oxide, with at least 2, preferably 5 repeating units, and β) at least one associative group B.

By "associative group" is meant any group capable of forming associative bonds, that are non-permanent (i.e. reversible) physical interactions, such as ionic bonds, hydrogen bonds, ion-dipole interactions, dipole-dipole interactions, and the like. The presence of such associative groups in the here-above described polycondensates make it possible the building of supramolecular assembly, as defined above. In the present invention, "associative bonds" preferably means hydrogen bonds, and more preferably hydrogen bonds between nitrogen-containing group(s).

The polycondensates for use in the present invention are characterised by the number of repeating units A1, and the number of associative groups B. Preferably, the ratio (number of repeating units A1)/(number of associative groups B) is different from 0, preferably strictly greater than 0 and smaller than 200, more preferably between 0.1 and 100, still more preferably between 0.2 and 50, advantageously between 0.3 and 20.

Although A1 may be also capable of forming a associative bond(s) (for example when A1 is an amide repeating unit), the A1 repeating units are not counted as a group B for determining the above-defined ratio characterising the polycondensates for use in the present invention.

Moreover, the polycondensates for use in the present invention have a weight molecular weight ($M_W$) comprised between 200 Daltons and 1,000 kiloDaltons, preferably between 1000 Daltons and 500 kiloDaltons, more preferably between 2000 Daltons and 100 kiloDaltons.

The polycondensates of the present invention comprise two or more repeating unit(s) A1, which may be identical or different. Preferred polycondensates comprise repeating units A1 wherein z is 1 and X represent $—C(R^1)(R^2)—$ (polyamide repeating units), and/or wherein z is 0 and X represent oxygen (polyester repeating units), and/or wherein z is 1 and X represent oxygen (polyurethane repeating units), and/or wherein z is 1 and X represent $—N(R^1)—$ (polyurea repeating units). The polycondensates for use in the bituminous compositions of the present invention may be homopolymers, block copolymers, random copolymers. Particularly preferred are the polyamide polycondensates, and especially polyamides wherein $—C(R^1)(R^2)—$ represents $—CH_2—$ (i.e. $R^1=R^2=H$).

In a preferred embodiment, the polycondensate used in this invention includes the reaction product(s) from the polycondensation between di-, tri- or poly-functionalised carboxylic acid monomer(s) and di-, tri- or poly-functionalised amine monomer(s), such as for example di-, tri- or poly-functional carboxylic acid(s), di-, tri- or poly-polyfunctional amine(s), and mixtures thereof.

The resulting polycondensate is a so-called polyamide, which may be obtained according to classical polycondensation reaction as known by the skilled in the art. The resulting polyamide may be either further reacted with at least one compound comprising at least one associative group B, for example at least one compound comprising of the associative group(s) B as defined above, or the polycondensate may be prepared in the presence of at least one compound comprising at least one associative group B, for example at least one compound comprising any of the associative group(s) B, as defined above. In the latter case, it must be understood that the at least one compound comprising at least one associative group B is present together with the monomers during the polycondensation reaction.

In another embodiment, the polycondensate used in this invention includes the reaction product(s) from the polycondensation between di-, tri- or poly-functionalised carboxylic acid monomer(s) and di-, tri- or poly-functionalised alcohol monomer(s), such as for example di-, tri- or poly-functional carboxylic acid(s), di-, tri- or poly-polyfunctional alcohol(s), said polycondensate (which is a polyester) being further reacted with, or prepared in the presence of at least one compound comprising at least one associative group B, as described above.

In still a further embodiment, the polycondensate used in this invention includes the reaction product(s) from the polycondensation between di-, tri- or poly-functionalised isocyanate monomer(s) and di-, tri- or poly-functionalised amine(s) and/or alcohol monomer(s), such as for example di-, tri- or poly-functional aliphatic or aromatic isocyanate(s), and a di-, tri- or poly-polyfunctional amine(s), alcohol(s), and/or aminoalcohol(s), said polycondensate (which is a polyurethane or a polyurea) being further reacted with, or prepared in the presence of at least one compound comprising at least one associative group B, as described above.

Preferably, the polyfunctional carboxylic acids that may be used in the reaction to obtain the polycondensate of the invention are chosen from among saturated or unsaturated carboxylic fatty acids with at least 8 carbon atoms such as linear diacids such as suberic, azelaic, sebacic, undecanedioic, decanediodic, tetradecanedioic, pentadecanedioic, thapsic (hexadecanedioic acid), or octadecanedioic acids, branched diacids and more preferably the dimer(s) and trimer(s) containing fatty acid mixtures resulting from the oligomerization of unsaturated fatty acids from vegetal origin such as, myristoleic, palmitoleic oleic, linoleic, linolenic, ricinoleic, eicosenoic or docosenoic acids (found in pine, tall oil, corn, sunflower, soja soybean, rapeseed, raisin seeds, linen or jojoba) or animal origin like eicosapentenoic or docosahexenoic acids (found in fish oils), as well as mixtures thereof.

As preferred examples of carboxylic acids, mention may be made of the fatty acids comprising unsaturated molecules, for example of the oleic type that may be oligomerized by condensation reaction of the double bonds. This reaction results in blends that essentially comprise dimers and trimers, although small quantities of higher oligomers, such as tetramers, and pentamers, may be present. By fatty acid dimers and trimers it is understood the oligomers of 2 or 3 identical or different monomers. Advantageously, these fatty acids, saturated or unsaturated, comprise 12 to 100 carbon atoms and more advantageously 21 to 90.

Blends of fatty acid oligomers comprise, in general, a given ratio of fatty acid dimers and trimers. The proportion of fatty acid monomer and higher oligomers (tetramers, pentamers, etc. . . . ) is low in comparison with the proportion of fatty acid dimers and trimers.

Examples of fatty acid dimer and trimer molecules are shown below, representing the cyclic dimer and trimer from the fatty acid with 18 carbon atoms, $C_{18}$. Commercial products are blends of isomers of such compositions, including also partially or totally hydrogenated structures.

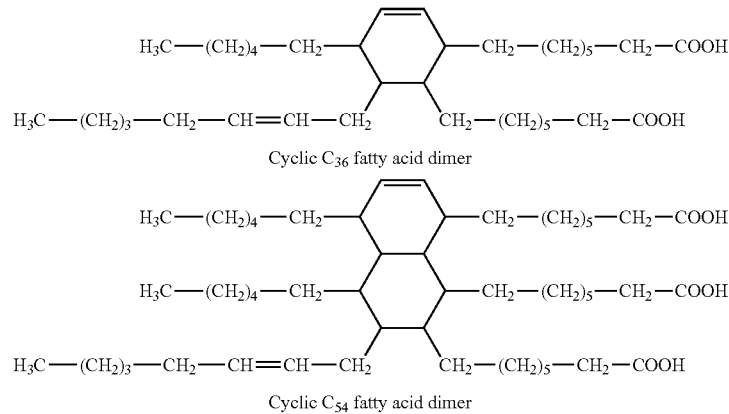

Cyclic $C_{36}$ fatty acid dimer

Cyclic $C_{54}$ fatty acid dimer

A preferred blend of fatty acid oligomers comprises dimers, trimers and monomers of the $C_{18}$ fatty acid (linear of cyclic). A still preferred blend comprises:
 0.1 to 40% by weight, more preferably from 0.1 to 10 wt % of identical or different fatty acid monomers;
 0.1 to 99.8% by weight, more preferably from 18 to 98 wt % of identical or different fatty acid dimers; and
 0.1 to 99% by weight, more preferably from 2 to 80 wt % of identical or different fatty acid trimers.

Commercial examples of such dimer and trimer fatty acid mixtures are: the Uniqema products Pripol® 1017, Pripol® 1048, Pripol® 1013, Pripol® 1040, Pripol® 1009 and Pripol® 1006, the Arizona chemicals products Unidyme® 60, Unidyme® 40 and Unidyme® 14, the Cognis products Empol® 1008, Empol® 1018, Empol® 1043, Empol® 1045, Empol® 1016 and the products from Oleon, such as Radiacid® 0980 and Radiacid® 0950. These products, Pripol®, Unidyme®, Empol®, and Radiacid®, comprise fatty acid monomers of $C_{18}$ and fatty acid oligomers multiples of $C_{18}$.

Preferably, polyfunctional amines that may be used in the polycondensation reaction to obtain the polycondensate for use in the present invention are saturated or unsaturated polyamines with at least 6 carbon atoms such as linear diamines such as hexamethylenediamine, aromatic diamines such as the phenylenediamine and more preferably the amines obtained from the ammoniation (conversion of carboxylic groups intro nitrile groups) and hydrogenation of fatty acids with at least 8 carbon atoms, such as the polyfunctional carboxylic acids described above, as well as mixtures thereof.

Preferred examples of polyfunctional amines issued from polyfunctional carboxylic acids are those resulting form the ammoniation and hydrogenation of dimer and trimers of fatty acids such as described in WO 2008/053113. Commercially available polyfunctional amines, such as Versamine® from Cognis, may also be used for the preparation of the polycondensates useful for the present invention.

In another embodiment of the invention, the polyfunctional organic amines may be polyetheramines such as diamines of polyethylene and/or polypropylene oxide. Commercial examples of such diamines are the Jeffamine® D400, Jeffamine® D2000 and Jeffamine® D4000 commercialised by Hunstman.

Preferably, the polyfunctional alcohols that may be used in the polycondensation reaction to obtain the polycondensate for use in the present invention are linear or branched, saturated or unsaturated diols, preferably with at least 6 carbon atoms, such as hexanediols, heptanediols, octanediols, nonanediols, decanediols, undecanediols, dodecanediols, (typically hexane-1,6-diol, heptane-1,7-diol, octane-1,8-diol, nonane-1,9-diol, decane-1,10-diol, undecane-1,11-diol, dodecane-1,12-diol), aromatic diols such as resorcinol, hydroquinone, Bisphenol A, branched diols such as 1,6-hexylene glycol, as well as mixtures thereof, and more preferably the dimmer(s) and trimer(s) containing alcohol mixtures resulting from the hydrogenation of oligomerized unsaturated fatty acids, such as those described above, as well as mixtures thereof.

In another embodiment of the invention, the polyfunctional alcohols may be oligomers or polymers of alkylene diol(s), such as a polyethylene glycol, ethylene glycol or butylene glycol, as well as mixtures thereof.

Preferably, the polyfunctional isocyanates that may be used in the polycondensation reaction to obtain the polycondensate for use in the present invention are linear of branched, saturated or unsaturated diisocyanates with at least 6 carbon atoms such as aliphatic or cycloaliphatic diisocyanates, preferably 1,6-hexamethylene di-isocyanate, 4,4'-dicyclohexylmethane diisocyanates, 1,4-cyclohexane diisocyanate, bis(isocyanatomethyl)cyclohexane, aromatic isocyanates such as toluene-2,4-di-isocyanate, toluene-2,6-di-isocyanate, 4,4'-methylenediphenyldi-isocyanate, 2,4'-methylenediphenyldiisocyanate, para-phenyldi-isocyanate, naphthancle-1,5-di-isocyanate or IPDI (isophoronedi-isocyanate), and the like, as well as mixtures thereof.

As described above, the polycondensate for use in the present invention comprises at least one associative group, which is covalently bound to said polycondensate by reacting said polycondensate, or reacting the monomers of the polycondensate, with at least one compound comprising at least one functional group T and at least one group B capable of forming associative, preferably hydrogen, bonds, said groups T and B being covalently bonded together by means of at least one, and preferably one (1), spacer group Sp.

In the compounds comprising at least one group T, at least one group B and at least one group Sp, the functional group T may be any chemically reactive functional moiety capable of forming a covalent bond with the polycondensate and/or the monomers of said polycondensate, and preferably such moiety is chosen form among amine, alcohol, thioalcohol, halogen, carboxylic acid, thiocarboxylic acid, carboxylic acid anhydride, thiocarboxylic acid anhydride, carboxylic acid halide, thiocarboxylic acid halide, isocyanate, epoxide, sulphonic acid, and the like, amine, alcohol and carboxylic acid being most preferred.

It is to be understood that the covalent bonds, formed by the reaction of group T with the polycondensate and/or the monomers of said polycondensate, are not counted for calculating the sum of the repeating units A1 present in the polycondensate as defined above.

The at least one spacer group Sp allows to bind together the at least one group T and the at least one group B, and may be of any kind known to the skilled in the art.

By way of non limiting examples, the spacer group Sp is preferably chosen from among linear, branched, or cyclic, $C_1$-$C_{20}$ hydrocarbon chain, optionally comprising one or more double and or triple bond(s), aromatic ring(s), and/or one or more heteroatom(s). Said hydrocarbon chain may be substituted.

According to a preferred aspect, the spacer group Sp is a linear or branched $C_1$-$C_6$ hydrocarbon chain.

Group B capable of forming associative bonds, preferably hydrogen bonds, is a nitrogen-containing group capable of forming non-permanent (i.e. reversible) physical interactions, such as ionic bonds, hydrogen bonds, ion-dipole interactions, dipole-dipole interactions, and the like. Preferably group B is chosen from among groups B1 to B7:

(B1)

(B2)

(B3)

(B4)

(B5)
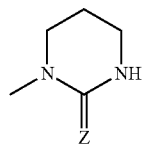

(B6)
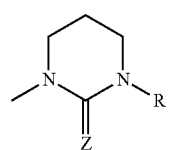

(B7)
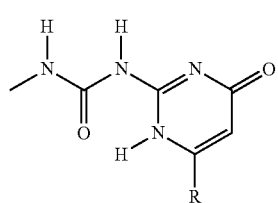

wherein Z represents oxygen, sulphur or a —NH group, preferably oxygen, and R represents any substituting moiety, for example $C_1$-$C_{10}$ linear or branched alkyl.

The compounds comprising at least one group T, at least one spacer group Sp, and at least one group B may, for example, be represented by any of the following formulae (1a) to (1f):

(1a)

(1b)

(1c)

(1d)

(1e)

(1f)

It should be understood that when more than one group T are present, they may be identical or different. Similarly, when more than one group B are present, respectively more than one spacer group Sp are present, they may be identical or different.

As a general and non-limiting way, the above compounds (1a) to (1l) preferably comprise not more than 4 groups T, and/or not more than 4 groups B. They comprise 1, 2 or 3, preferably 1, Spacer groups Sp.

According to a preferred embodiment the compound is of formula (1a) above.

Non limiting examples of compounds to be reacted with the polycondensate, or the monomers of said polycondensate, include 1-(2-aminoethyl)-imidazolidin-2-one (UDETA), 1-(2-[(2-aminoethyl)amino]ethyl)imidazolidone (UTETA), 1-(2-{2-[(2-aminoethyl)amino]ethyl}amino)ethyl]imidazolidone (UTEPA), N-(6-aminohexyl)-N'-(6-methyl-4-oxo-1,4-dihydropyrimidin-2-yl)urea (UPy), 3-amino-1,2,4-triazole (3-ATA) and 4-amino-1,2,4-triazole (4-ATA), as well as mixtures thereof. UDETA is preferred for use in the present invention.

All the above described compounds comprising at least one group T, at least one group Sp and at least one group B are either known per se and commercially available or easily prepared according to procedures known to the skilled in the art, or else easily prepared form procedures available in the scientific literature, patent literature, the Chemical Abstracts or on the Internet.

By way of example, UDETA, UTETA and UTEPA may be prepared by reacting urea with diethylene triamine (DETA), triethylene tetramine (TETA) and tetraethylene pentamine (TEPA) respectively.

Preferred examples of compounds comprising the above-described preferred groups B3 to B6, correspond to the product of the reaction of urea with moieties comprising $NH_2$ or NH functions separated by 2 or more atoms, preferably by 2 or 3 carbon atoms, and more precisely, from the reaction of urea with amines, alkylene amines, amino alcohols or amido amines. Examples of the result of the reaction of urea with a polyalkylamine are:

UDETA: 2-aminoethylimidazolidin-2-one or 1-(2-aminoethyl)imidazolidin-2-one, resulting from the reaction of urea and diethylene triamine (DETA);

UTETA: 1-(2-[(2-aminoethyl)amino]ethyl)imidazolidin-2-one, resulting from the reaction of urea and triethylene tetramine (TETA);

UTEPA: 1-(2-{2-[(2-aminoethylamino)ethyl}amino) ethyl]imidazolidin-2-one, resulting from the reaction of urea and tetraethylene pentamine (TEPA).

Other examples of compounds with structures of formulae B3 to B6 above are those obtained from the reaction of urea or thiourea with:

polyamines such as dipropylene triamine, di-(1,2-butylene)triamine(s), di-(2,3-butylene)triamine(s), N-methyldiethylene triamine(s), N-ethyldiethylene triamine(s) and tripropylene tetramine(s);

amino alcohols such as 2-[(2-aminoethyl)amino]ethanol.

Non-limiting examples of compounds with structure(s) of preferred formulae B1 and B2 are the 4-amino-1,2,4-triazole and 3-amino-1,2,4-triazole respectively.

According to another aspect, the present invention relates to the above-defined polycondensates comprising at least two repeating units A1 and at least one associative group B, with the proviso that the ratio of the sum of the said repeating units to the sum of groups B is different from 0.

Such polycondensates, that form a further aspect of the present invention, are prepared according to any processes known by the skilled artisan, as previously described, and for example according to any known processes for preparing conventional polycondensates, additionally reacting at least one compound comprising at least one group T, at least one group B and at least one group Sp, so that the at least one functional group T forms a covalent bond with the polycondensate and/or the monomers of said polycondensate.

Non-limiting examples of such polycondensates of the present invention are those obtained by the reaction of:

fatty acid oligomer, amine issued from the ammoniation of a fatty acid oligomer and UDETA;
fatty acid oligomer, amine issued from the ammoniation of a fatty acid oligomer and UTETA;
fatty acid oligomer, amine issued from the ammoniation of a fatty acid oligomer and 4-amino-1,2,4-triazole;
fatty acid oligomer, linear diamine with 10 carbon atoms and UDETA;
fatty acid oligomer, linear diamine of polypropylene oxide and UDETA;
fatty acid oligomer, linear diamine of a polyethylene/polypropylene oxide and UDETA;
sebacic acid, amine issued from the ammoniation of a fatty acid oligomer and UDETA;
fatty acid oligomer, mixture of amine issued from the ammoniation of a fatty acid oligomer and a linear diamine with 10 carbon atoms, and UDETA;
fatty acid oligomer, mixture of amine issued from the ammoniation of a fatty acid oligomer and a linear diamine of polypropylene oxide, and UDETA;
suberic acid, amine issued from the ammoniation of a fatty acid oligomer and UDETA;
fatty acid oligomer, decanediol and UDETA;
fatty acid oligomer, polypropylene glycol and UDETA;
suberic acid, alcohol oligomer issued from the hydrogenation of a fatty acid oligomer, and UDETA;
sebacic acid, polypropylene glycol and UDETA;
fatty acid oligomer, alcohol oligomer issued from the hydrogenation of a fatty acid oligomer and UDETA;
fatty acid oligomer, alcohol oligomer issued from the hydrogenation of a fatty acid oligomer and UTETA;
fatty acid oligomer, a mixture of decanediol and an alcohol oligomer issued from the hydrogenation of a fatty acid oligomer, and UDETA;
hexamethylene di-isocyanate, alcohol oligomer issued from the hydrogenation of a fatty acid oligomer, and UDETA;
toluene di-isocyanate, an alcohol oligomer issued from the hydrogenation of a fatty acid oligomer, and UDETA;
toluene di-isocyanate, an alcohol oligomer issued from the hydrogenation of a fatty acid oligomer; and UTETA;
hexamethylene di-isocyanate, mixture of decanediol and alcohol oligomer issued from the hydrogenation of a fatty acid oligomer, and UDETA;
toluene di-isocyanate, polypropylene glycol and UDETA.

According to a particularly preferred embodiment, examples of polycondensates useful for the invention are those obtained from the reaction of a fatty acid dimer/trimer, a diamine issued from ammoniation and hydrogenation of a fatty acid dimer/trimer and 2-aminoethylimidazolidin-2-one (UDETA) as the compound comprising the group capable of forming the supramolecular assembly, resulting in the following polyamide, which may be schematically represented with the below structure:

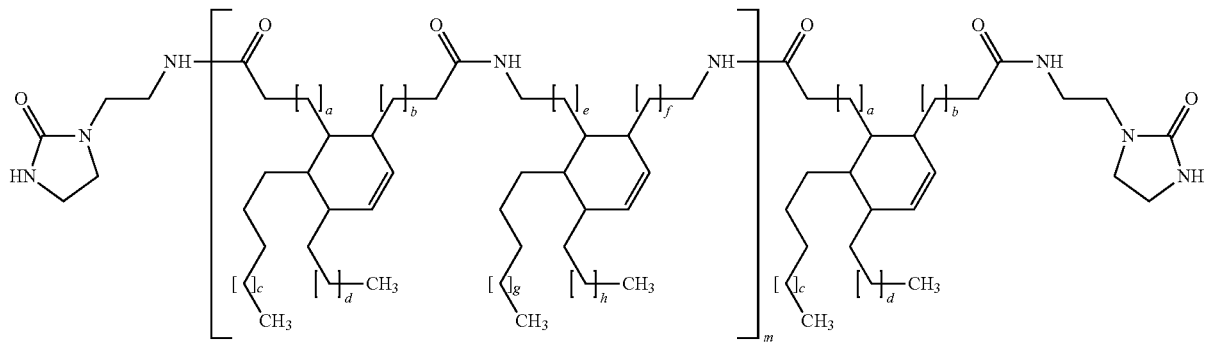

wherein a, b, c, d, e, f, g, and h are comprised between 1 and 24, preferably between 2 and 20 and even more preferably between 4 and 16, m is an integer having value greater than or equal to 1 and smaller than 2000.

Another example of a polycondensate of the present invention and useful in the bituminous compositions of said present invention, is the one obtained by the reaction of a fatty acid dimer/trimer, a diol issued from the hydrogenation of a fatty acid dimer/trimer and 2-aminoethylimidazolidin-2-one (UDETA), resulting in the following polyester, which may be schematically represented with the below structure:

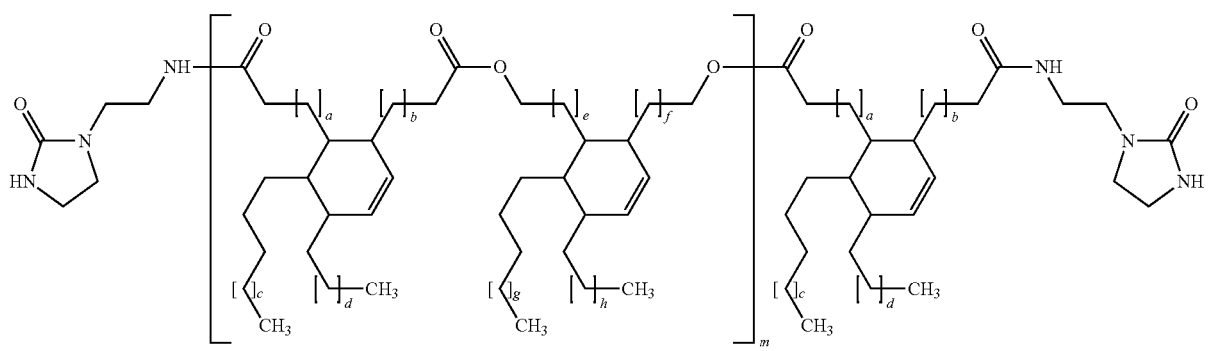

wherein a, b, c, d, e, f, g, h and m are as defined above.

Still another example of a polycondensate of the present invention and useful in the bituminous compositions of said present invention, is the one obtained by the reaction of a linear saturated diisocyanate, a diol issued from the hydrogenation of a fatty acid dimer/trimer and 2-aminoethylimidazolidin-2-one (UDETA), resulting in the following polyurethane, which may be schematically represented with the below structure:

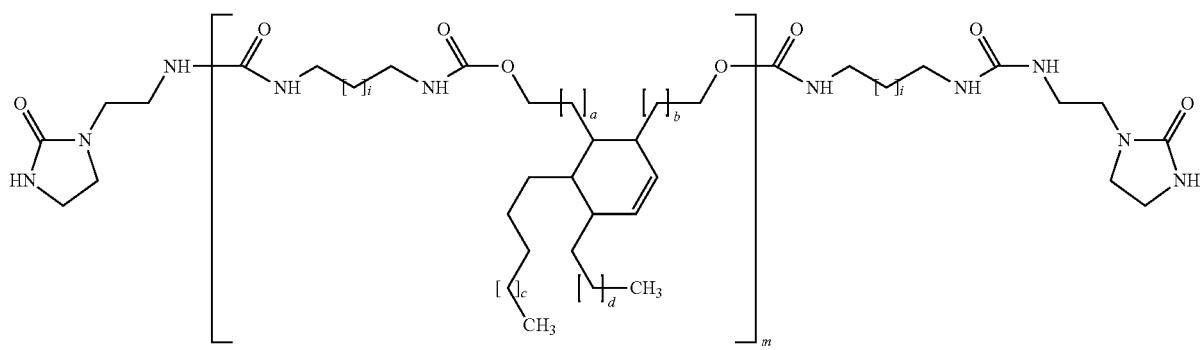

wherein a, b, e, d, e, f, g, h, m are as defined above, and i is comprised between, 4 and 20.

The polycondensate used in the invention may also result from the reaction involving other fatty acid derivates such as a fatty acid ester or fatty acid chloride. A preferred fatty acid ester is a fatty acid methyl ester, in particular a fatty acid methyl ester of a fatty acid dimer or a mixture of fatty acid oligomers as described above. An example of a fatty acid chloride can be the sebacoyle chloride.

The polycondensate used in the inventions may or may not be prepared in stoichiometric proportions. For example, in the case of a dimer/trimer acid, a dimer/trimer amine and the UDETA, the number of the total reactive amine groups (dimer/trimer amine and UDETA) can be adjusted to be in stoichiometric proportions with the fatty acids, meaning one amine (or UDETA molecule) for each acid group in the fatty acid or in non-stoichiometric proportions, meaning an excess or shortage of amines for each acid group.

It is well in the scope of the invention to chemically cross-link the polycondensate by the use of a cross-linking agent before, or more preferably after the bituminous composition has been prepared. Examples of such cross-linking agents may be urea, sulphur or sulphur-containing molecules such as di-tert-dodecylpentasulphide.

The content of the at least one polycondensate in the present invention is preferably in the range of 0.05 parts by weight to 20 parts by weight for 100 parts by weight of bitumen(s). Less than 0.05 parts by weight of the polycondensate would not lead to the expected effects. An amount of the polycondensate higher than 20 parts by weight would be compatible with the aim of the present invention, this upper limit of 20 parts by weight being set for economic purposes only. The expected effects would also be achieved with amounts of more than 20 parts by weight, and even more than 30 parts or 40 parts by weight.

The bituminous composition of the present invention may be in the form of an aqueous emulsion, the amount of water generally ranging from 10 vol % to 70 vol % of the total volume of the emulsion.

The above-described polycondensates surprisingly show low viscosity in the range of temperatures at which bitumen compositions are generally prepared and at the same time present good mechanical properties at application temperatures (road application for example).

Without being bound to theory, an explanation of these properties could be the result of the formation of thermoreversible associations or bonds between the polycondensates, principally by the associative groups B present in the polycondensate. These associations are of the hydrogen bond type. The number of associations can be more than two per molecule, resulting in the formation of a network that can further improve the mechanical properties of the polycondensate at lower temperatures.

The bituminous composition of the present invention offers a unique advantage over regular polymer-modified bitumens in their preparation process. Normally, the dispersion of a regular polymer in bitumen requires heating the bitumen to temperatures higher than their normal storage temperatures (by about 20° C.), long mixing times (usually hours), as well as specific mixing devices with high shear conditions. In contrast, the preparation process for the present invention can be carried out at temperatures much closer to those at which the pure bitumen is regularly stored and in significantly shorter times (minutes) under mild to low shear conditions.

The bituminous composition of the present invention preferably has the structure of a dispersion or a solution. By dispersion is meant a two or more phase structure. A two- or multiple-phase structure may be observed with an optical microscope thanks to the difference of refractive indexes, one phase being dispersed in the form of spheres into the other phase; the interface between the two phases appears sharp enough under the optical microscope. By a "solution" is meant a monophasic object showing no sharp change of the refractive index within it, and hence no sharp shapes inside.

When the bituminous composition of the present invention has the structure of a dispersion, two situations are possible. In the first dispersion situation, the polycondensate is essentially present in a dispersed phase within the bitumen phase. It is possible that this dispersed phase also contain some components of the bitumen swelling the above said polycondensate component. In the second dispersion situation, the polycondensate is essentially present in the continuous phase. It is possible that some components of the bitumen swell the above said polycondensate component. In this situation, the dispersed phase is essentially bitumen.

The two above situations can be encountered depending on the dosage of the above said polycondensate component and on the nature of the bitumen. It is important to adjust the structure of the bituminous composition to the application to optimise its performances. For example, bituminous compositions that are to be transported for long distances in a polycondensate concentrated form for sake of economy advantageously comprise a dispersion of the swollen polymer into the continuous phase. For example, a dispersion with dispersed objects that are not homogeneously distributed reflects a poor storage stability.

According to another embodiment, the bitumen composition of the present invention may further includes at least one anionic, cationic, zwitterionic or amphoteric surfactant added into the bitumen or into the water phase.

The bituminous composition of the present invention may also comprise one or several other components, such as those commonly used in the field of bitumen and asphalts. These may include anti-stripping agents, generally anionic, cationic, zwitterionic or amphoteric surfactants. Non-limiting examples of such anti-stripping agents are: alkylcarboxylic acids, sulphated surfactants, sulphonated surfactants, alkyl or aryl carboxylic acids, fatty acid esters of quaternary alkanol amines, alkyl amido polyamines, alkyl imidazolines and alkyl imidazo polyamines, the products from the reaction between polyamines and fatty carboxylic acids, the products from the reaction between alkyl polyamines and fatty carboxylic acids, and in a similar manner, the products from the reaction between fatty acids or vegetal oil and diethanolamine, followed by the reaction with polyamines. Non-limiting examples of quaternary alkanol amines are betain salts and N,N,N-trialkyl choline salts with strong organic or inorganic acids, such as for example (methane)sulphonic acid.

The polyamines are, as non-limiting examples, dimethyl amino propylamine, N-amino ethyl piperazine, diethylene triamine, triethylene tetramine and tetraethylene pentamine.

Other additives that may be advantageously added to the bituminous composition described in this invention are chosen from among:

polyphosphoric acid, comprising all different existing grades and designations of polyphosphoric acids including pyrophosphoric acid, triphosphoric and metaphosphoric acids with phosphonic acid, pyrophosphates, and other similar compounds comprising at least one (OH—)P=O group, such as those described in WO 2008/148974, polymers, generally used in order to improve the mechanical performance of the bitumen and the asphalt mixture, paraffins, for example Fischer-Tropsch paraffins described in U.S. Pat. No. 6,588,974, fluxants, esters of fatty acids and functionalised waxes, dialkyldiamides as for example those cited in WO 2007/73378, resin components, such as rosin acids, or modified rosin acids, tall oil pitch, pine tar pitch, pine rosins, tall oil rosins, asphaltites, e.g. Gilsonite®, oils from vegetal or mineral sources and derivatives thereof, as well as mixtures of two or more of the above additional additives.

Other additives that may be advantageously added to the bituminous composition described in this invention are chosen from among those used to reduce the production temperature of an asphalt mixture, such as those described in WO 2006/106222 and WO 2007/141458.

According to a further aspect, the present invention also encompasses the addition of regular polymers generally used in order to improve the mechanical performance of the bitumen and the mixture, i.e. commonly used in the modification of bitumen such as: styrene butadiene rubbers, styrene/butadiene block copolymers, ethylene—vinyl acetate copolymers, ethylene—acrylate copolymers, polyethylene and other alpha-polyolefins (as disclosed in "Asphalt binder testing manual", Asphalt Institute 2007) as well as crumb rubbers.

All these other components and additives can be added to the bituminous compositions by any known means. Generally, the amount of said other components and additives are present in the bituminous composition of the present invention in an overall amount ranging from 0.01% to 30% by weight to the total mass of the bituminous composition.

In another aspect, the present invention relates to the process for the preparation of a bituminous composition comprising at least one polycondensate comprising at least one associative group B comprising at least the steps of:

adding 0.05 to 20 parts by weight of the polycondensate defined above either in a solid, molten, dissolved or dispersed state to 100 parts by weight of a bitumen at its standard temperature for bitumen storage, depending on its class, as described in NF EN 13108-1 of February 2007, optionally adding, before or after the addition of the polycondensate, one or more additives such as those described herein before, mixing, preferably under mild agitation, by any mechanical means for a period of time generally ranging from 1 minute to several hours, typically from 1 minute to 60 minutes, and obtaining a bituminous composition ready to use.

The bituminous composition obtained according to the above process may be produced at any stage of the logistic chain starting at the refinery and ending in the mixer of the mixing plant, and used as such or mixed with mineral aggregates to yield asphalts mixtures.

According to another embodiment, the polycondensate, in a molten or dissolved state, may be added to a continuous flow of the bitumen by any known means, like for example using a direct injection or a direct injection and a static mixer.

In another aspect, the here-above process is carried out to yield an aqueous emulsion of bitumen comprising the polycondensate, the amount of water generally ranging from 10 to 70 vol % of the total volume of the emulsion. In such a case, the bituminous composition is mixed with a water phase containing one or more emulsifier(s), such as those commonly used by the skilled in the art, using a static mixer or a mixer with moving parts or a combination of both of them.

According to another aspect, the present invention relates to a formulation comprising at least one polycondensate as defined above, and at least one or more additives, such as those listed herein before, typically chosen from among anti-stripping agents, polyphosphoric acid, the additives described in WO 2008/148974, paraffins, for example Fischer-Tropsch paraffins described in U.S. Pat. No. 6,588,974, esters of fatty acids and functionalised waxes, dialkyldiamides as for example those cited in WO 2007/073378, resin components, such as rosin acids, tall oil pitch, pine tar pitch, pine rosins, tall oil rosins, asphaltites, e.g. Gilsonite®, regular polymers, crumb rubbers, oils from vegetal or mineral sources and their derivatives, as well as those used to reduce the production temperature of an asphalt mixture described in WO 2006/106222 and WO 2007/141458.

Depending on the nature of the polycondensates and of the additives, such formulations may not present satisfying storage stability. In such cases the above-defined formulations may advantageously be in the form of a two-pack component, for example the polycondensate(s) on the one-side, and the additive(s) on the second-side or alternatively, the polycondensate(s) with some of the additives on the one-side, and the remainder of the additives on the second side.

The main application for the polycondensates, formulations, and bituminous compositions comprising the same and as presented in this invention is the fabrication of asphalt mixtures for the coating of rolling surfaces, typically for the construction of roads, parking lots, airport runaways or any similar rolling surface. Other applications for the bituminous compositions of the present invention are water-proofing applications, such as for examples water-proofing of roofs, terraces, walls, and the like, as well as applications in adhesive formulations.

The bituminous composition as described in this invention as well as the resulting asphalt mixture fabricated with said bituminous composition surprisingly have enhanced mechanical properties, over the bituminous compositions and asphalt mixtures known in the art.

Therefore, and according to still another aspect, the invention relates to a surface, which is coated in whole or in part with a bituminous composition as previously described and/or an asphalt mixture as defined above, said surface being generally a rolling surface, such as roads, parking lots, bridges, motorways, highways, airport runaways or any similar rolling surface, and also any surface requiring bituminous or asphalt coating, such as pavements, side walks, playgrounds, roofs, terraces, walls and the like.

The mineral aggregates used with the bituminous composition of the present invention to fabricate an asphalt mixture are not limited in chemical nature, shape or size and may be the products from quarries, aggregates recuperated from previous asphalt mixtures (reclaimed asphalt pavement, RAP for example defined in the French Standard AFNOR XP P98-135 from December 2001), products from building demolition and the mixture of any of the above. The asphalt mixture prepared with the bituminous composition presented in this invention may contain other common components of asphalt mixtures such as organic fibres (for example: cellulose, cotton, polypropylene, polyester, polyvinyl alcohol and polyamide fibres) and inorganic fibres (for example: glass, metal or carbon fibres).

In an embodiment of the invention, the bituminous composition is used for the known techniques of tack coat, cheap seal, in surface dressings, surface impregnation, roof coating or membrane, waterproofing employing anhydrous bituminous composition or as an emulsion.

The bituminous composition described in this invention may be used in any asphalt mixture fabrication methods such as those employing bituminous emulsion addition, hot bitumen addition, or any of the several processes for warm or semi-warm asphalt mixture fabrication (where fabrication temperature is above room temperature but below that in regular hot mixing process), like the bitumen foaming techniques, for example US 2008/00259714 which uses a special foaming device associated with a multistep heating and drying and mixing device, U.S. Pat. No. 5,910,212 and WO 97/20890 which use a hard bituminous binder combined to the mixture of a soft bituminous binder and aggregates, or US 2005/0076810 which uses a high desorption capacity additive, or EP 1 469 038 in which a part of the aggregates is heated and dried and mixed with bitumen and then after mixed with wet aggregates, or US 2006/00236614 in which the aggregates are dried and mixed with bitumen but with the drying step so that a fraction of the initial humidity of the aggregates remains, or WO 07/112335 which uses a water in oil bitumen dispersion with selected surfactants, or U.S. Pat. No. 6,588,974 which uses a Fischer-Tropsch paraffin added into the bitumen, in conjunction or in partial or total replacement of the bitumen mentioned.

The bituminous composition described in the present invention provides advantages over conventional water/bitumen or bitumen/water emulsion fabrication processes with regular polymer-modified bitumens. Reduced viscosity at lower temperature allows for the preparation of emulsions with modified bitumen owing to this invention at lower temperatures and pressure. Lower penetration grades of bitumen can be used.

According to another aspect, the present invention relates to the process for the preparation of an asphalt mixture, where the polycondensate in a solid, melted, dissolved or dispersed state is added to the mineral aggregates before, at the same time or after the bitumen or bituminous composition is added into the mixing process.

This applies also to the other components and additives that may be added to the asphalt composition: anti-stripping agents, polyphosphoric acid, paraffins, for example Fischer-Tropsch paraffins described in U.S. Pat. No. 6,588,974, esters of fatty acids and functionalised waxes, dialkyldiamides as for example those cited in WO 2007/073378, resin components, such as rosin acids, tall oil pitch, pine tar pitch, pine rosins, tall oil rosins, Gilsonite®, fluxants, regular polymers, crumb rubbers, oils from vegetal or mineral sources and their derivatives, as well as those used to reduce the production temperature of an asphalt mixture described in WO 2006/106222, WO 2007/141458 and WO 2008/148974.

The above process for the preparation of an asphalt mixture may advantageously be carried out where the bituminous composition of the invention is in the form of an aqueous emulsion.

The present invention also offers several advantages to the fabrication, laying and compaction of asphalt mixtures produced by hot mixing. Fabrication of an asphalt mixture with the invention by hot mixing can be carried out at similar temperatures to those usually used with the pure bitumen. This is not generally possible with regular polymer-modified bitumens since a considerable increase in viscosity takes place when it is cooled from the preparation temperature to the temperature at which the pure bitumen is usually stored (about 20° C. difference). An increase in viscosity leads to a difficult or incomplete coverage of the mineral aggregate by the modified bitumen.

This increase in viscosity would also negatively impact the laying and compaction of the asphalt mixture. In asphalt mixtures fabricated with the bituminous composition presented in this invention, no particular problem related with an increase in viscosity would take place since it remains similar to those of pure bitumen at fabrication, laying and compaction temperatures.

In addition, asphalt mixture fabrication with the bituminous composition presented in this invention may be carried out at temperatures even below those usually practiced with pure bitumen, for example below those at which the pure bitumen is commonly stored. Such asphalt mixtures may also be laid and compacted at lower temperatures, presenting better fluidity than those fabricated with regular polymer-modified bitumen while still enhancing the mechanical properties of the mixture at final application conditions.

The reduction in the fabrication temperature by using the bituminous compositions of the invention would have as a consequence, a reduction in the consumed energy during asphalt mix fabrication since the mineral aggregates do not have to be heated as much as in the fabrication with regular modified bitumen. In addition, this reduction of energy also implies a reduction in $CO_2$ and other greenhouse-effect gas emissions, and a reduction in bitumen and polymer oxidation.

Another advantage of the invention when used to fabricate an asphalt mixture is its ease of recycling compared to those fabricated with regular polymer-modified bitumen, particularly to those that are chemically cross-linked, because once reheated the asphalt mixture comprising the bituminous composition of the present invention has a better fluidity at the same temperature, facilitating the handling, flow, mixing and compacting steps.

The present invention is now illustrated by means of the following examples, which do not intend to limit it in any way.

EXAMPLES

Examples of Preparation of Polycondensates used in the Invention

In all examples, the equivalent molar masses of reagents are obtained by alkalinity measures for the amines and acidity index for the acids.

Example 1

In a 500 cm$^3$ glass reactor equipped with a variable speed stirrer motor, with inlets for introducing reactants, for introducing inert gases, such as nitrogen, and for measurement probes (e.g., temperature probe), with a vapour condensation/extraction system which could be connected to a vacuum-producing system (vacuum pump, vacuum traps, etc.), and a jacket enabling the contents of the reactor to be heated/cooled by circulating inside it a heat-transfer fluid, such as oil from a thermostated bath, 0.1 M (63 g) of a fatty acid dimer Pripol® 1040 is introduced and heated to 160° C. under stirring and a nitrogen atmosphere. After that, 0.14 M (18.8 g) of 1-(2-aminoethyl)imidazolin-2-one (UDETA) is added dropwise and the temperature is then kept at 160° C. for 1 hour.

Subsequently, 0.027 M (16.8 g) of Versamine® 551 (Cognis) with a total alkalinity of 3.25 are added. The generated water is distilled off and continuously collected in a Dean-Starck apparatus. The reaction continues until no more water is distilled. The obtained polycondensate is taken out of the reactor in the molten state.

The obtained polycondensate has a complex modulus, G*, of 1.1 MPa at 25° C. (measured with a Physica MCR301 rheometer from Anton Paar under a strain of 1% at 1.6 Hz). The ratio of A1 over B groups of the obtained polycondensate was calculated, based on the molar amounts of Versamine® 551 and UDETA. The functionality of Versamine® 551 was arbitrary set to 2 (the average functionality being equal to, or greater than 2, Versamine® being mainly a mixture of di- and tri-amines). UDETA has one group B per mole. The A1/B ratio of the polycondensate of Example 1 is equal to (0.027*2)/(0.14*1), i.e. 0.38.

Example 2

In a 500 cm$^3$ glass reactor equipped with a variable speed stirrer motor, with inlets for introducing reactants, for introducing inert gases, such as nitrogen, and for measurement probes (e.g., temperature probe), with a vapour condensation/extraction system which could be connected to a vacuum-producing system (vacuum pump, vacuum traps, etc.), and a jacket enabling the contents of the reactor to be heated/cooled by circulating inside it a heat-transfer fluid, such as oil, coming from a thermostated bath, 0.1 M (63 g) of a fatty acid dimer Pripol® 1040 is introduced and heated to 180° C. under stirring and a nitrogen atmosphere. After that, 0.055 M (9.53 g) of 1,10-decanediamine is added and the temperature is then kept at 180° C. for 30 minutes.

Subsequently, 0.09 M (12 g) of UDETA is added dropwise. The generated water is distilled off and continuously collected in a Dean-Starck apparatus. The reaction is carried out for 4 hours at 180° C. The obtained polycondensate is taken out of the reactor in the molten state.

The obtained polycondensate has a complex modulus, G*, of 0.23 MPa at 25° C. (measured as in Example 1. The A1/B ratio was calculated as in Example 1, based on the amounts of Pripol 1040, and UDETA. The functionality of 1,10-decanediamine is 2. The A1/B ratio is equal to (0.055*2)/(0.09*1), i.e. 1.22.

Example 3

Example 2 is repeated, changing the nature and quantity of the added amine with 0.06 M (34.9 g) Versamine® 551 with a total alkalinity of 3.44. The temperature is then kept at 180° C. for 30 minutes. Subsequently, 0.08 M (10.7 g) of UDETA is added dropwise. The generated water is distilled off and continuously collected in a Dean-Starck apparatus. The reaction is carried out for 4 hours at 180° C. The obtained polycondensate is taken out of the reactor in the molten state.

The obtained polycondensate has a complex modulus, G*, of 0.33 MPa at 25° C. (measured as in Example 1). The A1/B ratio of the obtained polycondensate was calculated, based on the introduced amounts of Versamine® 551 (functionality arbitrary set to 2, as explained in Example 1), and UDETA, and is (0.06*2)/(0.08*1), i.e. 1.5.

Example 4

In a reactor similar to those used in the previous examples, 0.05 M (31.5 g) of a fatty acid dimer Pripol® 1040 is introduced and heated to 180° C. under stirring and a nitrogen atmosphere. After that, 0.04 M (166 g) of a polyetheramine commercially available under the name of Jeffamine® D4000, with a total alkalinity of 0.48, are added and the temperature is then kept at 180° C. for 30 minutes. Subsequently, 0.02 M (2.6 g) of UDETA is added dropwise. The generated water is distilled off and continuously collected in a Dean-Starck apparatus. The reaction is carried out for 4 hours at 180° C. The obtained polycondensate is taken out of the reactor in the molten state.

The obtained polycondensate has a complex modulus, G*, of 0.001 Mpa at 25° C. (measured as in Example 1). The A1/B ratio of the obtained polycondensate was calculated, based on the amounts of Jeffamine® D4000 (functionality=2), and UDETA, and is (0.04*2)/(0.02*1), i.e. 4.

Example 5

As a comparative example, an organogel compound as described in FR 2 924 121, i.e. a compound containing no repeating unit A1 in the sense of the present invention (ratio A1/B=O), is prepared as follows: in a reactor similar to that used in the previous examples, 10.265 g of Empol® 1008 (a fatty acid dimmer from Cognis) and 5.2 g of UDETA are introduced and heated to 190° C. under stirring conditions and under nitrogen atmosphere.

The generated water is distilled off and continuously collected in a Dean-Starck apparatus. The reaction is carried out for 24 hours at 190° C. The obtained organogel compound is taken out of the reactor in the molten state. The obtained organogel compound has a complex modulus, G*, of 0.21 MPa at 25° C. (measured with a Physica MCR301 rheometer from Anton Paar under a strain of 1% and 1.6 Hz).

Example 6

The complex viscosity of the polycondensates used in the invention, prepared as described in examples 1 and 3 was measured using a dynamical shear rheometer (MCR 301 from Anton Paar). Values for such parameters at 1.6 Hz at 160° C. and 120° C. are presented in Table 1. The value of a pure polyethylene vinyl acrylate) copolymer (EVA 20/20) (Evathane® 20/20, Arkema) is also shown for comparison. It can be observed that the viscosity of the polycondensates is significantly lower than that of the EVA, being close to 2 orders of magnitude lower in the case of the polycondensate from example 1 at both temperatures. The preparation of the bituminous composition in the invention is carried out in a very simple manner, thanks to this reduced viscosity.

TABLE 1

|  | Viscosity (Pa·s, 140° C.) | Viscosity (Pa·s, 120° C.) |
|---|---|---|
| EVA 20/20 | 45.1 | 126 |
| Polycondensate of Example 1 | 0.70 | 4.49 |
| Polycondensate of Example 3 | 6.75 | 37.6 |

Example 7

The preparation of a bituminous composition according to the invention was carried out by adding 5 parts of the polycondensate prepared as described in example 1 in solid form into 100 parts of a TOTAL bitumen with a penetration of 35/50. The bitumen was previously heated to 160° C. and kept at that temperature under mild stirring conditions (about 100 RPM) during the addition of the polycondensate. After the addition of the polycondensate, the mixture was stirred for 15 minutes to obtain an homogenous mixture (Composition 1).

Example 8

The storage modulus, G', and loss modulus, G" of the composition described in example 7 were measured using a dynamical shear rheometer (MCR 301 from Anton Paar). Values for such parameters at 1.6 Hz at 40° C., 60° C. and 80° C. are shown on Table 2. As a comparison, the pure 35/50 bitumen values are also shown. It can be observed that the bituminous composition of the invention improves the modulus values with respect to pure bitumen. The storage modulus of the invention is from about two times (40° C.) to one order of magnitude higher (80° C.) than that of the pure bitumen. The loss modulus is also higher for the bituminous composition of the invention than for the pure bitumen.

TABLE 2

|  | G' (MPa) 40° C. | G' (MPa) 60° C. | G' (MPa) 80° C. | G" (MPa) 40° C. | G" (MPa) 60° C. | G" (MPa) 80° C. |
|---|---|---|---|---|---|---|
| 35/50 Pure bitumen | $6.06 \times 10^{-2}$ | $6.16 \times 10^{-4}$ | $8.99 \times 10^{-6}$ | $2.46 \times 10^{-1}$ | $8.01 \times 10^{-3}$ | $5.51 \times 10^{-4}$ |
| Composition 1 | $1.11 \times 10^{-1}$ | $2.31 \times 10^{-3}$ | $8.29 \times 10^{-5}$ | $2.83 \times 10^{-1}$ | $1.22 \times 10^{-2}$ | $9.46 \times 10^{-4}$ |

Example 9

A bituminous composition was prepared by adding 5 parts of the polycondensate prepared as described in example 3 in solid form into 100 parts of a TOTAL bitumen with a penetration of 35/50. The bitumen was previously heated to 160° C. and kept at that temperature under mild stirring conditions (about 100 RPM) during the addition of the polycondensate. After the addition of the polycondensate was complete, the mixture was stirred for 15 minutes to obtained an homogenous mixture (Composition 2).

An asphalt mixture was prepared using this Composition 2. The following mineral aggregates with a standard granulometry for the construction of pavements were used for this asphalt mixture:

| | |
|---|---|
| Limestone filler | 1.5% |
| Sand 0/4 | 48.5% |
| Aggregate 4/6 | 14% |
| Aggregate 6/10 | 36% |

Composition 2 was mixed to the mineral aggregates at 160° C., as in a regular hot mixture asphalt fabrication process. The content of composition 2 in the asphalt mixture was 5.6% with respect of the aggregates. The resulting asphalt mixture was compacted using a gyratory press at 160° C. The compacted sample was then cooled down and kept at constant temperature (20° C.) for 24 hours before testing.

A reference sample using pure 35/50 bitumen, and two comparisons samples, one with 100 parts of a 35/50 bitumen modified with 5 parts of an EVA 20/20 (Evathane® 20/20, Arkema) and another with 5 parts of a commercial polymer-modified bitumen with SBS (SHELL) were done in identical manner. Indirect tensile tests measurements were carried out on all samples using an Instron universal testing machine on compression at a 50 mm/min rate.

Values for elastic modulus, obtained from the compression curves are shown in Table 3. It can be clearly seen that in this case composition 2 surprisingly has a significantly higher modulus than the pure bitumen and it is comparable to that of the samples carried out with the SBS polymer. Both, the composition of the invention and the one done with the SBS are higher than the one prepared with the EVA modified bitumen. It can be observed that an asphalt mixture carried out with the bituminous composition of the invention results in similar mechanical properties as with conventional polymer-modified bitumens.

TABLE 3

| | Pure 35/0 | 35/50 Bitumen with 5% EVA | SBS modified bitumen | Composition 2 |
|---|---|---|---|---|
| Modulus (MPa) | 65 | 94 | 113 | 112 |

Example 10

Indirect tensile strength ratios (ITSR) were measured following ASTM D4867 (1 day at 60° C. conditioning) on asphalt mixtures prepared in example 9. A sample prepared with pure 35/50 bitumen as a reference was also carried out.

In addition, an ITSR test was also carried out on asphalt mixtures prepared according to the procedure of Example 9, comprising a bituminous composition containing the organogel compound of example 5 (Composition 3) to demonstrate the advantages of the present invention. This Composition 3 was prepared by adding 5 parts of the organogel compound of Example 5 into 100 parts of a TOTAL bitumen with a penetration of 35/50. The bitumen was previously heated to 170° C. and kept at that temperature under mild stirring conditions (about 100 RPM) during the addition of the organogel. After the addition of the organogel was complete, the mixture was stirred for 2 hours to obtained a homogenous mixture.

Table 4 below shows the ratios (ITSR) between the fracture force of an asphalt mixture sample that was tested after being stored under dry conditions and another that was stored under water at 60° C. for one day.

TABLE 4

| | Pure 35/50 | Asphalt mixture with Composition 3 | Asphalt mixture of Example 9 |
|---|---|---|---|
| ITSR | 0.44 | 0.23 | 0.58 |

It can be observed that the sample prepared with the compound of Example 5 decreases the ITSR of the asphalt mixture, making it more sensible to moisture damage.

On the other hand the sample carried out with composition 2, a polycondensate subject matter of this invention, does not only decrease this value, but also actually and surprisingly increases it. This shows a clear advantage of bituminous compositions of the present invention over other bituminous compositions comprising molecules with similar associative groups such as the one disclosed in comparative Example 5.

The invention claimed is:

1. Polycondensate capable of forming a supramolecular assembly comprising:

α) at least two repeating units of formula (A1):

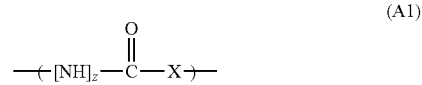

wherein X represents oxygen, —C(R$^1$)(R$^2$)— or —N(R$^1$)—, wherein R$^1$ and R$^2$ represent hydrogen or a C$_1$-C$_6$ linear or branched alkyl, and z is an integer with values 0 or 1, provided that when z is 0, X does not represent —C(R$^1$)(R$^2$)—, the repeating units A1 being separated from each other by:

α1) different or identical linear or branched, saturated or unsaturated, C$_1$-C$_{100}$, hydrocarbon chain(s), optionally containing hydrocarbon ring(s), aromatic ring(s) and/or heterocyclic ring(s), and/or α2) alkylene oxide chain(s) with at least 2 repeating units, and β) at least one associative group B selected from the group consisting of:

-continued

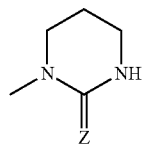
(B5)

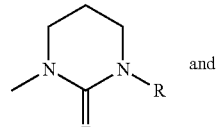
(B6)
and

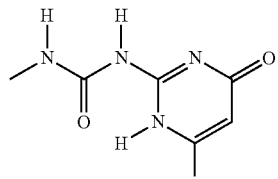
(B7)

wherein Z represents oxygen, sulphur or a —NH group and R represents a $C_1$-$C_{10}$ linear or branched alkyl;

wherein the associative group B is covalently bound to the polycondensate by reacting the polycondensate or the monomers of the polycondensate with at least one compound comprising at least one functional group T and at least one associative group B, groups T and B being covalently bonded together by means of at least one spacer group Sp; and wherein the covalent bonds formed by the reaction of group T with the polycondensate and/or the monomers of the polycondensate are not counted for calculating the sum of the repeating units A1 present in the polycondensate.

2. Polycondensate capable of forming a supramolecular assembly of claim 1, wherein said alkylene oxide chain is selected from the group consisting of ethylene oxide, propylene oxide and butylenes oxide.

3. Polycondensate of claim 1, wherein the ratio A1/B is different from 0.

4. Polycondensate of claim 1, wherein the at least one polycondensate comprises at least two repeating units A1 and at least one associative group B, the ratio A1/B being between 0.1 and 100.

5. Polycondensate of claim 1, having a weight molecular weight ($M_W$) of between 200 Daltons and 1,000 kiloDaltons.

6. Polycondensate of claim 1, which is a homopolymer, a block copolymer, or a random copolymer, having amide, ester, urethane or urea repeating units.

7. Formulation comprising at least one polycondensate comprising:

α) at least two repeating units of formula (A1):

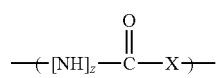
(A1)

wherein X represents oxygen, —C($R^1$)($R^2$)—, or —N($R^1$)—, wherein $R^1$ and $R^2$ each independently represents hydrogen or a $C_1$-$C_6$ linear or branched alkyl, and z is an integer with values 0 or 1, provided that when z is 0, X does not represent —C($R^1$)($R^2$)—, the repeating units A1 being separated from each other by:

α1) different or identical linear or branched, saturated or unsaturated, $C_1$-$C_{100}$, hydrocarbon chain(s), optionally containing hydrocarbon ring(s), aromatic ring(s) and/or heterocyclic ring(s), and/or α2) alkylene oxide chain(s), with at least 2 repeating units, and β) at least one associative group B selected from the group consisting of

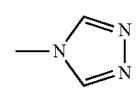
(B1)

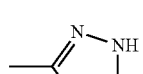
(B2)

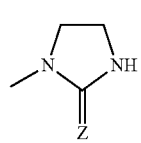
(B3)

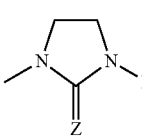
(B4)

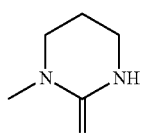
(B5)

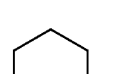
(B6)
and

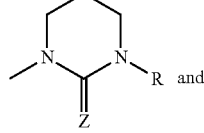
(B7)

wherein Z represents oxygen, sulphur or a —NH group and R represents a $C_1$-$C_{10}$ linear or branched alkyl, wherein the associative group B is covalently bound to the polycondensate by reacting the polycondensate or the monomers of the polycondensate with at least one compound comprising at least one functional group T and at least one associative group B, groups T and B being covalently bonded together by means of at least one spacer group Sp; and wherein the covalent bonds formed by the reaction of group T with the polycondensate and/or the monomers of the polycondensate are not counted for calculating the sum of the repeating units A1 present in the polycondensate further comprising one or more additives selected from the group consisting of anti-stripping agents, polyphosphoric acid, pyrophosphates, paraffins, esters of fatty acids and functionalised waxes, dialkyldiamides, resin components, regular polymers, crumb rubbers, fluxants, asphaltites, vegetal oils, and mineral oil.

* * * * *

UNITED STATES PATENT AND TRADEMARK OFFICE
CERTIFICATE OF CORRECTION

PATENT NO. : 8,252,865 B2  Page 1 of 1
APPLICATION NO. : 13/288339
DATED : August 28, 2012
INVENTOR(S) : Juan Antonio Gonzalez Leon et al.

It is certified that error appears in the above-identified patent and that said Letters Patent is hereby corrected as shown below:

On the Title page, Item (75) the name of the city "Lyons" should be --Lyon--

Claim 7, the structure shown in part (B7) of the formula should be

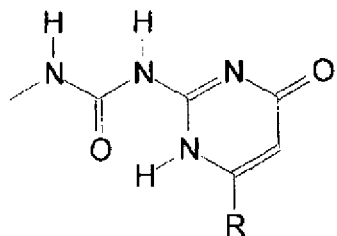

(B7)

Signed and Sealed this
Eleventh Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,252,865 B2  Page 1 of 1
APPLICATION NO. : 13/288339
DATED : August 28, 2012
INVENTOR(S) : Juan Antonio Gonzalez Leon et al.

It is certified that error appears in the above-identified patent and that said Letters Patent is hereby corrected as shown below:

On the Title page, Item (75) the name of the city "Lyons" should be --Lyon--

Column 28, lines 45-53, Claim 7, the structure shown in part (B7) of the formula should be

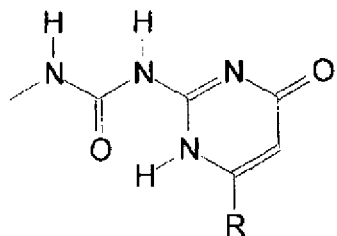

(B7)

This certificate supersedes the Certificate of Correction issued December 11, 2012.

Signed and Sealed this
First Day of January, 2013

David J. Kappos
*Director of the United States Patent and Trademark Office*